United States Patent [19]

Persson et al.

[11] 3,973,634
[45] Aug. 10, 1976

[54] DEVICE FOR FEEDING A REEL ALONG A TRACK

[75] Inventors: Jan Edvard Persson, Nacka; Sven Axel Ekman, Saltsjobaden, both of Sweden

[73] Assignee: Atlas Copco Aktiebolag, Nacka, Sweden

[22] Filed: Sept. 27, 1973

[21] Appl. No.: 401,439

[30] Foreign Application Priority Data
Oct. 6, 1972 Sweden............... 12987/72

[52] U.S. Cl. ............................................. 173/147
[51] Int. Cl.²........................................ E21C 5/06
[58] Field of Search ............. 173/147, 43, 156, 152; 74/411.5

[56] References Cited
UNITED STATES PATENTS

| | | | |
|---|---|---|---|
| 2,730,332 | 1/1956 | Hale | 173/147 |
| 3,162,253 | 12/1964 | Curtis | 173/147 |
| 3,500,941 | 3/1970 | Rudman | 173/43 X |
| 3,508,619 | 4/1970 | Huffman | 173/147 |
| 3,744,575 | 7/1973 | Strommes | 173/43 X |

*Primary Examiner*—Ernest R. Purser
*Assistant Examiner*—William F. Pate, III
*Attorney, Agent, or Firm*—Eric Y. Munson

[57] ABSTRACT

A device for driving a hose or cable reel along a feed beam of a drilling machine at half the speed of the drilling machine. The device comprises a slide guided by the feed beam in which a sprocket wheel is journalled in the slide and is rotated by engagement with the drive chain or similar drive means for the drilling machine to move back and forth in engagement with a stationary member on the feed beam at half the speed of the drilling machine.

5 Claims, 5 Drawing Figures

DEVICE FOR FEEDING A REEL ALONG A TRACK

BACKGROUND OF THE INVENTION

The present invention relates to a device for driving a hose or cable reel along a feed beam for a drilling machine. In machines which are driven forwards and backwards along a feed beam by means of pressure fluid or electric power there are hoses or cables which often are difficult to keep in order so that they are not damaged or cause damage or are in the way. In connection with drilling machines which move back and forth along a certain track hose or cable reels have, therefore, often been arranged, over which the hoses or the cables are passed and which are mounted so as to maintain the hoses or cables in stretched condition. The reels move along the track with a speed which is half the speed of the movement of the machine along the track. Such devices tend to become expensive and complicated.

SUMMARY OF THE INVENTION

The invention contemplates a simple and robust device of aforementioned kind which is suitable for use in mines and other working places where the working conditions often exert a strain on the materiel. The invention also contemplates a device which is constructed of easily obtainable reliable machine elements. If the track is arranged in a sloping or vertical direction, the safety factor especially important in order to avoid accidents, and a further object of the invention is to provide a device which easily can be rendered safe for the operator. A simple and robust device which solves these problems is defined in the subsequent claims.

BRIEF DESCRIPTION OF THE DRAWING

In the accompanying drawing an embodiment of a driving device according to the invention is shown by way of example and which is designed for application to a feed beam of a rock-drilling machine.

DESCRIPTION OF AN EMBODIMENT OF THE INVENTION

Figure 1:
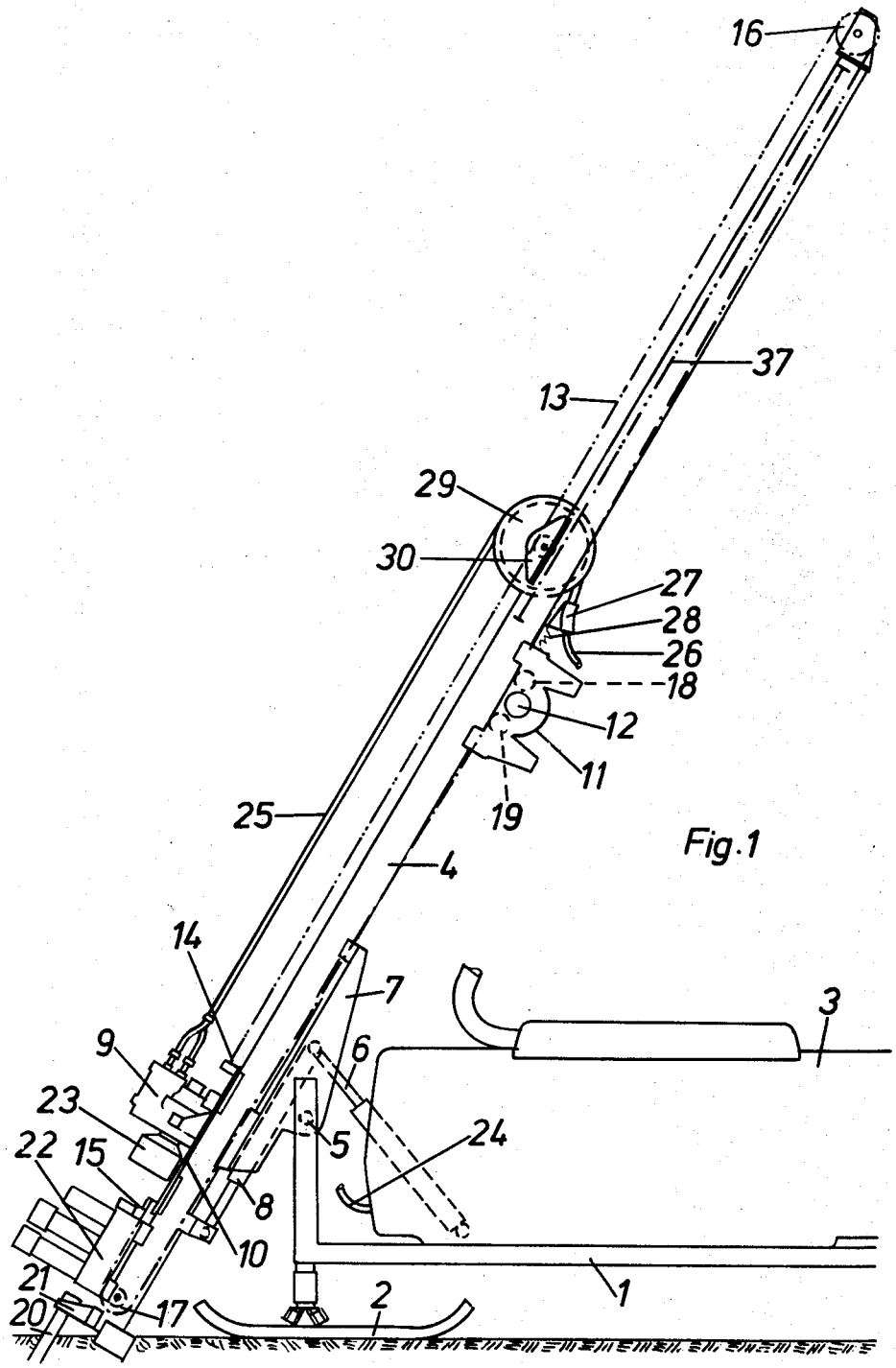
FIG. 1 shows schematically in side view a drilling equipment for rotary drilling by means of a drilling machine which is movable back and forth along a feed beam.
Figure 3:
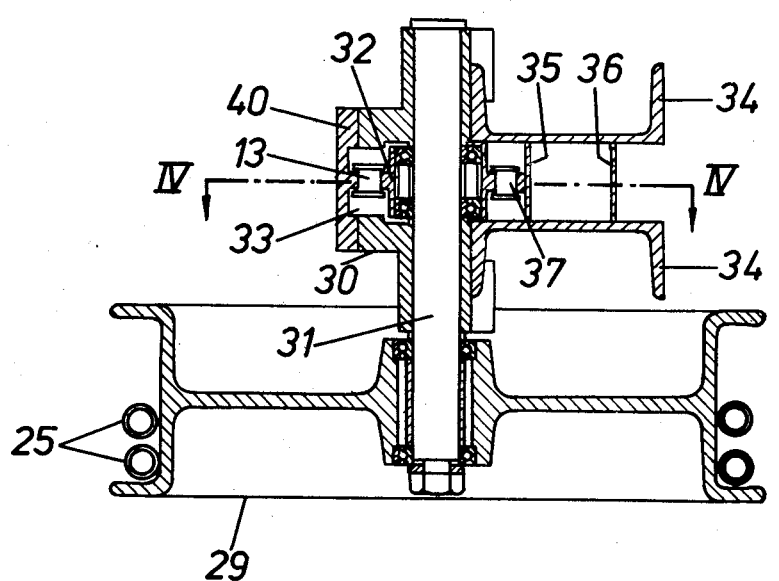
FIG. 2 shows a part of the device according to FIG. 1 on a larger scale and FIG. 3 is a section along the line III—III in FIG. 2.
Figure 2:
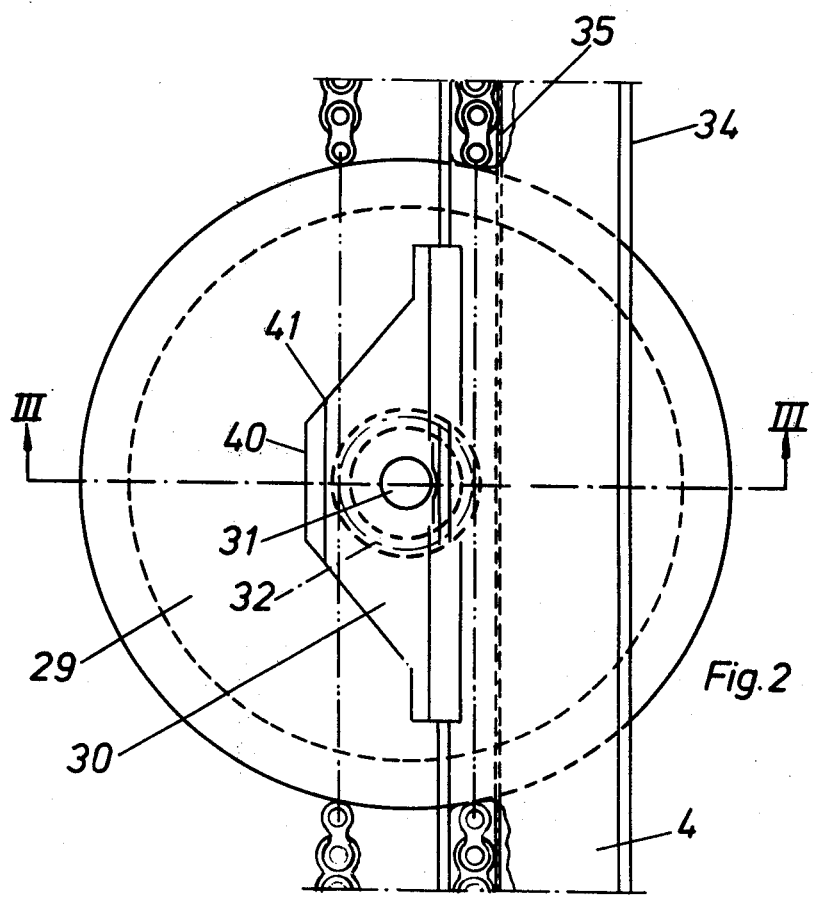
Figure 5:
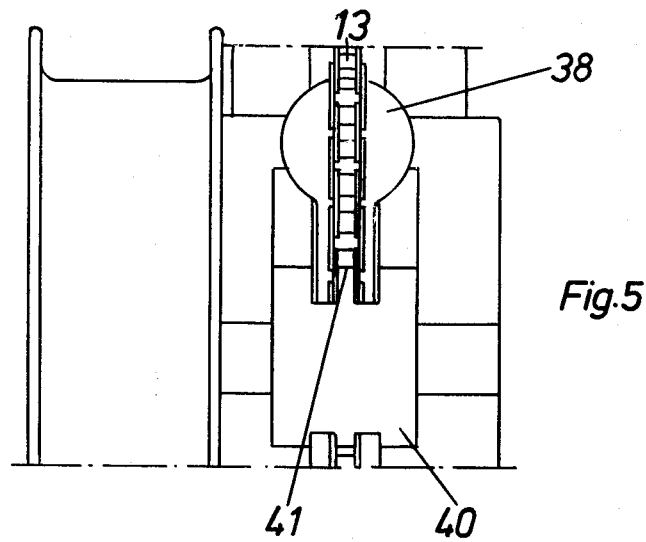
FIG. 5 is a plan view seen in the direction of the arrows V-V in FIG. 4.

The drilling equipment shown in the figures comprises a frame 1 which is mounted on runners 2 for movement within the working area and which carries a motor driven pumping system 3 for supplying the pressure fluid which is used for driving the drilling machine and for driving the feed motor, jacks, and the like which form part of the drilling equipment. When using compressed air for this operation, the pumping system 3 will, of course, be a motor comprsssor. A feed beam 4 is by means of a hydraulic jack 6 pivotally journalled on a shaft 5 on the frame 1. The feed beam 4 rests on a yoke frame 7 in which it is deplaceable a short distance in its longitudinal direction by means of a jack 8. A drilling motor 9 is arranged, for rotary drilling, on a slide 10 on the feed beam which slide is displaceable along guides on the feed beam by means of a reversible feed motor 11 which is connected to the underside of the feed beam 4. The feed motor 11 drives a sprocket 12 engaging which a chain 13 which at its ends is fastened at points of attachment 14 and 15 on the slide 10. The chain 13 engages sprockets 16, 17 at the upper and lower ends of the feed beam 4, respectively, and sprockets 18, 19 of the feed motor.

Reference numeral 20 indicates a drill tube or a drill rod, e.g. for diamond rock-drilling, and 21 a guide for the drill tube. The number 22 is a chuck device at the lower end of the feed beam and the reference numeral 23 indicates a chuck device on the drilling machine. The drilling machine and the chucks can be made as described in US patent 3 696 872 owned by the common assignee of the present invention. The drilling machine, the feed motor, and other hydraulic equipment is supplied with pressure fluid from the main conduit 24 from which branch conduits (not shown) branch off to different hydraulically driven devices. Hoses for pressure fluid to and from the drilling motor are, among others, arranged with a first part 25 connected to the drill motor 9 and with a second part 26 connected to the pump 3 and a transition between these parts a clamp 27 is arranged which by means of a comparatively long draw spring 28 acts on the part 25 in the longitudinal direction of the feed beam.

The hose part 25 engages a hose reel 29 which is carried by a slide 30 and journalled on a shaft 31 mounted in the slide. The hose reel 29 as well a sprocket 32 are journalled by means of ball bearings on the shaft 31. The chain 13 of the feed motor is passed through a guiding channel 33 in the slide 30 which channel is designed so as to maintain the chain in engagement with the sprocket 32. The feed beam 4 comprises in the shown embodiment two U-shaped channel beams 34 the webs of which are welded to two longitudinal plates 35, 36. The plate 35 forms a supporting wall for a chain 37 which is connected to the feed beam. The sprocket 32 is maintained in engagement with the chain 37 by reason of the fact that the slide 30 is slidably guided along the flanges of the channel beams 34 parallel to the plate 35.

When the feed motor 11 is driven forwards or backwards the drilling motor 9 moves downwards or upwards along the feed beam according to FIG. 1, whereby that part of the chain 13 which runs through the slide 30 rotates the sprocket 32 causing the latter move along the stationary chain 37 and drive the slide 30 downwards or upwards along the feed beam 4 at one half of the speed at which the drilling motor 9 moves along the feed beam. The two hose parts 25 which conduct pressure fluid to or from the drilling motor 9 and which travel over the reel 29 will consequently be kept under tension regardless of the location of the drilling motor on the feed beam 4. Variations of the tension, depending upon whether or not the hose parts 26, 25 are pressurized, is absorbed by the spring 28.

Hoses for flushing fluid have not been shown in the drawing but such hoses can, of course, be passed over the hose reel 29 to the drill motor or a water swivel in the same way as the hoses 25.

Figure 4:
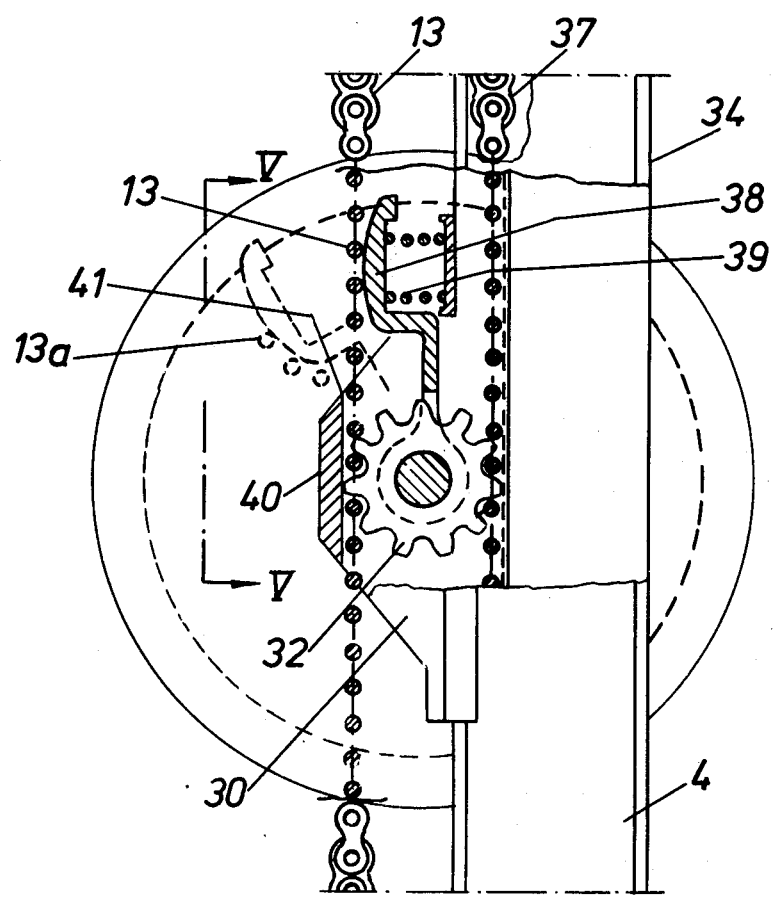
FIG. 4 is a view similar to FIG. 2 partly in section along the line IV—IV in FIG. 3 and showing a safety device for preventing an accident in the event of chain breakage.

The slide 30 shown is suitable for the installation of a protective safety device in the event of chain breakage in that part of the chain 13 wich is situated above the slide 30 and travelling over the top of sprocket 16 backwards down to the feed motor 11. A shoe 38 is swingably journalled in the slide 30 and is pressed against the chain 13 with slight force by a spring 39 which force, however, is sufficient to swing the chain 13 to the position 13a shown in FIG. 4 if the chain should develop a slack as a result of breakage above the slide 30 or between the sprocket 12 and the sprocket 16. The guiding channel 33 in the slide 30 can suitably be formed in a piece of plate 40 which forms a cover on the slide 30 and which at 41 forms a nib which when the chain 13 is swung over to the position 13a will cam in between two pins of the links of the chain and thus lock the latter and thereby prevent the drilling machine from sliding down aong the feed beam. The shoe 38 is shaped so that it strives to fold the chain 13 over the nib 41. In the event of breakage below the slide 30 the machine will hang in the hoses.

The above described device is, of course, only to be regarded as an example which can be modified in different ways within the scope of the claims. A stationary rack can e.g. be arranged instead of the stationary chain 37 whereby the sprocket 32 is substituted by a sprocket which cooperates with the feed chain 13 and a toothed wheel which cooperates with the rack and which is bolted to the sprocket in a suitable way or is made in one piece with the sprocket and journalled on the axle 31.

What we claim is:

1. A device for driving a reel for a power supply conduit along a feed beam for a drilling machine, comprising a slide guided by the feed beam and carrying the reel, and a driving chain connected to the drilling machine, said slide comprising a sprocket which partly cooperates with the driving chain and partly is operatively connected to a device stationarily arranged along the feed beam for cooperation therewith in order to drive the reel with half the speed of the drilling machine, said stationarily arranged device comprising a chain and said slide comprising a guiding channel for the driving chain.

2. A device according to claim 1, in which said sprocket is rotatably journalled on an axle on the slide and the feed beam comprises a supporting wall for the stationary chain.

3. A device according to claim 2, in which said guiding channel is covered by a plate which comprises a nib which is arranged to cam into the driving chain upon slackening of the latter.

4. A device according to claim 3, in which a spring-loaded device is arranged on the slide for bringing the driving chain into engagement with the nib upon slackening of the driving chain.

5. A device according to claim 1, in which a power supply conduit passed over the reel has a first part which extends from the drilling machine along the feed beam and over the reel, and a second part which extends from the reel to a power supply unit, and in which a spring-urged clamp is mounted on the power supply conduit, which is effective to maintain said first part under tension.

* * * * *